United States Patent
Riazzi

(10) Patent No.: US 11,920,048 B2
(45) Date of Patent: Mar. 5, 2024

(54) NON-FLAMMABLE COATING LOADED WITH MICROCAPSULES ENCAPSULATING A FLAMMABLE PHASE CHANGE MATERIAL AND LAYERED STRUCTURES MADE THEREWITH

(71) Applicant: Microtek Laboratories INC., Dayton, OH (US)

(72) Inventor: Timothy J. Riazzi, Dayton, OH (US)

(73) Assignee: Microtek Laboratories INC., Dayton, OH (US)

( * ) Notice: Subject to any disclaimer, the term of this patent is extended or adjusted under 35 U.S.C. 154(b) by 254 days.

(21) Appl. No.: 17/354,157

(22) Filed: Jun. 22, 2021

(65) Prior Publication Data

US 2021/0395554 A1    Dec. 23, 2021

Related U.S. Application Data

(60) Provisional application No. 63/042,690, filed on Jun. 23, 2020.

(51) Int. Cl.

| | | |
|---|---|---|
| *C09D 125/10* | (2006.01) | |
| *C08K 5/3492* | (2006.01) | |
| *C09D 5/18* | (2006.01) | |
| *C09D 7/40* | (2018.01) | |
| *C09D 7/61* | (2018.01) | |
| *C09D 7/63* | (2018.01) | |
| *C09D 125/14* | (2006.01) | |
| *C08K 3/04* | (2006.01) | |
| *C08K 5/11* | (2006.01) | |
| *C08K 9/10* | (2006.01) | |

(52) U.S. Cl.
CPC .......... *C09D 125/10* (2013.01); *C08K 5/3492* (2013.01); *C09D 5/18* (2013.01); *C09D 7/61* (2018.01); *C09D 7/63* (2018.01); *C09D 7/70* (2018.01); *C09D 125/14* (2013.01); *C08K 3/042* (2017.05); *C08K 5/11* (2013.01); *C08K 9/10* (2013.01); *C08K 2201/005* (2013.01)

(58) Field of Classification Search
CPC .................................... C09D 5/18; C09D 7/61
See application file for complete search history.

(56) References Cited

U.S. PATENT DOCUMENTS

| | | |
|---|---|---|
| 5,804,297 A | 9/1998 | Colvin et al. |
| 6,124,394 A | 9/2000 | Goto et al. |
| 7,704,405 B2 | 4/2010 | Ottinger et al. |
| 9,605,158 B2 * | 3/2017 | Dubey ................. C09D 5/024 |
| 2004/0054035 A1 | 3/2004 | Hallissy et al. |
| 2010/0003518 A1 | 1/2010 | Grey |
| 2011/0089387 A1 | 4/2011 | Berry et al. |
| 2013/0264023 A1 | 10/2013 | Hudler et al. |
| 2015/0067967 A1 | 3/2015 | Tyree |
| 2017/0072604 A1 | 3/2017 | Sjong |
| 2018/0273820 A1 | 9/2018 | Lentz et al. |
| 2021/0179864 A1 * | 6/2021 | Khan ....................... B05D 7/06 |
| 2022/0127509 A1 * | 4/2022 | Brookins ............ D06M 13/292 |

FOREIGN PATENT DOCUMENTS

WO    2012156421 A1    11/2012

OTHER PUBLICATIONS

McLaggan et al., Fire Performance of Phase Change Material Enhanced Plasterboard, Fire Technology 2018, Aug. 19, 2017, 117-134, 54, CrossMark, USA.
International Search Report and Written Opinion, PCT/US2021/038379, dated Jun. 22, 2021 (11 pages).

* cited by examiner

*Primary Examiner* — Vickey Nerangis
(74) *Attorney, Agent, or Firm* — FisherBroyles, LLP; Susan M. Oiler

(57) ABSTRACT

Non-flammable structures are disclosed that have a substrate and a layer applied to the substrate that includes a phase change material that is flammable. The layer includes a binder having mixed therein about 50% to about 90% by weight of a microencapsulated phase change material and about 0.5% to about 10% by weight of an inorganic flame retardant. The inorganic flame retardant has a volume that increases upon exposure to heat or a flame. The binder is selected from the group consisting of a polyurethane, a styrene acrylic copolymer, a styrene butadiene copolymer, acrylic and combinations thereof.

8 Claims, 11 Drawing Sheets
(8 of 11 Drawing Sheet(s) Filed in Color)

Coating| Compare| Control

FLAMMABILITY TEST OF COATING WITH CHANGE PHASE CHANGE MATERIAL MICROCAPSULE SHELL CHEMISTRY

FIG. 14

INORGANIC FLAME RETARDANTS

| Flame Retardant | % by wt | BARRIERPRO 455 (% by wt) | PCM NEXTEK 24C (% by wt) | Xanthan Gum (% by wt) | Comments | Flame Test Results |
|---|---|---|---|---|---|---|
| Alumina Trihydrate | 9.7 | 40.6 | 49.3 |  | Easy to add. White, smooth. | Failure - Coating Ignited, burned 40+ seconds, extinguished with water. Low, light colored smoke. |
| Magnesium Hydroxide | 8.6 | 39.2 | 47.6 | 0 | Batch thick, water added. | Failure - Coating Ignited, burned 40+ seconds, extinguished with water. Low, light colored smoke. |
| Ammonium polyphosphate | 9.7 | 40.6 | 49.3 | 0.5 | PCM went in slowly, noticed air bubbles in batch that went away over time during mix. | Failure - Coating Ignited, burned 30+ seconds, extinguished with water. Low, light colored smoke. |
| Boric oxide 48.05%; Zinc Oxide 37.44% | 2.3 | 43.4 | 53.3 | 0.5 | White, smooth. | Failed - Sample Ignited, flame reached top of coating within 5 seconds, self-extinguished after 1 minute |
| Boric oxide 48.05%; Zinc Oxide 37.44% | 4.6 | 42.9 | 52.1 | 0.5 | White, smooth. | Failure - Sample ignited, burned 30+ seconds, extinguished with water. Low, light colored smoke. |
| Boric oxide 48.05%; Zinc Oxide 37.44% | 10.0 | 40.4 | 49.1 | 0.5 | White, smooth. | Good - Coating ignited, self-extinguished within 2 seconds. No smoke until flame extinguished. Smoke low, light color. |
| Inorganic Phosphorous Compound | 6.0 | 42.2 | 51.0 | 0.5 | Very easy to add FR. White, smooth. | Failure - Sample ignited, burned 30+ seconds, extinguished with water. Low, light colored smoke. |

NON-FLAMMABLE COATING LOADED WITH MICROCAPSULES ENCAPSULATING A FLAMMABLE PHASE CHANGE MATERIAL AND LAYERED STRUCTURES MADE THEREWITH

RELATED APPLICATIONS

This application claims the benefit of U.S. Provisional Application No. 63/042,690, filed Jun. 23, 2020, the entirety of which is incorporated herein by reference.

TECHNICAL FIELD

The present application relates to non-flammable coatings that have microcapsules comprising a phase change material core composition that is flammable, more particularly, to such coatings having an increased concentration of said microcapsules and a maximum of 10% by weight of an inorganic flame retarding additive together in a binder.

BACKGROUND

Heat absorbing technologies are used in many applications, including construction/building materials and comfort bedding. Typically, the desired effect of the heat absorbing technologies is to cool a surface and improve the usability of the materials. Currently, passive heat absorbing technologies are applied throughout a matrix to prevent negative consequences such as weakening the material or increasing the flammability as a result of the presence of a phase change material (PCM). These high amounts of PCM usually increase the tendency of the coating to burn after being exposed to open flames. This tendency is particularly high for paraffin-based PCM formulations. To improve flame retardancy, coatings have been developed to allow more widespread use of the passive heat absorbing technologies, or flame retardant materials have been incorporated throughout the matrix. Consequences to the distribution of the PCM in the matrix include slow energy transfer and a negative impact on the heat absorbing properties (e.g., a decrease in enthalpy), or even strongly fuming in the presence of fire.

The phase change material in the matrix can be present in the form of microcapsules. Microcapsules can be constructed of various types of wall or shell materials to house varying core material for many purposes. The encapsulation process is commonly referred to as microencapsulation. Microencapsulation is the process of surrounding or enveloping one substance, often referred to as the core material, within another substance, often referred to as the wall, shell, or capsule, on a very small scale. The microcapsules may be spherically shaped, with a continuous wall surrounding the core, while others may be asymmetrical and variably shaped.

General encapsulation processes include emulsion polymerization, bulk polymerization, solution polymerization, and/or suspension polymerization and typically include a catalyst. Emulsion polymerization occurs in a water/oil or oil/water mixed phase. Bulk polymerization is carried out in the absence of solvent. Solution polymerization is carried out in a solvent in which both the monomer and subsequent polymer are soluble. Suspension polymerization is carried out in the presence of a solvent (usually water) in which the monomer is insoluble and in which it is suspended by agitation.

A PCM is a substance with a high heat of fusion, melting and solidifying at a certain temperature, which is capable of storing and releasing large amounts of energy. Heat is absorbed or released when the material changes from solid to liquid and vice versa; thus, PCMs are classified as latent heat storage units. The latent heat storage can be achieved through solid-solid, solid-liquid, solid-gas and liquid-gas phase change, but solid-liquid is typically used in thermal storage applications as being more stable than gas phase changes as a result of the significant change in volume occupied by the PCM.

Since the development of microencapsulated PCMs and applications thereof, there has been a constant need for improved utilization thereof; in particular, there is a need for higher concentrations of PCM in the materials, while mitigating increased flammability and maintaining acceptable thermostability and enthalpy values.

SUMMARY

In all aspects, a non-flammable structure is disclosed that has a substrate coated with a layer that has a binder having mixed therein about 50% to about 90% by weight of microencapsulated phase change material and about 0.5% to about 10% by weight of an inorganic flame retardant. The inorganic flame retardant has a volume that increases upon exposure to heat or fire, and the binder is selected from the group consisting of a polyurethane, a styrene acrylic copolymer, a styrene butadiene copolymer, an acrylic, and combinations thereof. In all embodiments, the inorganic flame retardant can be or include an expandable graphite. In some embodiments, the binder is a styrene acrylic copolymer. In other embodiments, the binder is a styrene butadiene copolymer. The layer coated on the substrate can include a rheology modifier such as polycarboxylate ether superplasticizer. In all embodiments, the microencapsulated phase change material can be about 70% to about 90% by weight of the layer.

In all embodiments, the microencapsulated phase change material can have a polymer wall comprising a melamine formaldehyde reacted with a crosslinking agent to form a unit cell:

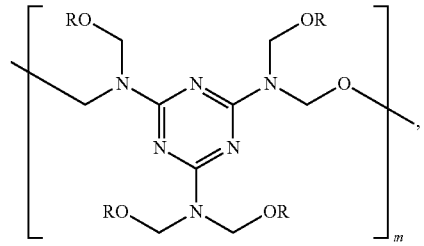

wherein R is H or $CH_3$. In such microcapsules the crosslinking agent comprises (a) a reaction product of a cyclic urea (U) and a multifunctional aldehyde (A), and (b) at least one crosslinker selected from the group consisting of (b 1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b 1), (b2) reaction products of urea and/or cyclic ureas and formaldehyde, (b3) alkoxycarbonylaminotriazines,
(b4) multifunctional isocyanates, optionally partially or completely blocked,
(b5) reaction products of phenols and aliphatic monoaldehydes,
(b6) multifunctional epoxides,
(b7) multifunctional aziridines, and
(b8) multifunctional carbodiimides,
wherein any of the crosslinkers (a) and (b) which have hydroxyl groups are optionally etherified with one or more linear, branched, or cyclic aliphatic alcohols, and are sold under the tradename NEXTEK by the Applicant.

In one embodiment, the substrate with the layer is able to be wound into rolls. The layer can have a thickness of 1 mm to 10 mm.

In another aspect, an article is disclosed that has a substrate having a coating layer applied directly thereto. The coating layer has about 50% to about 90% by weight of microencapsulated phase change material, a binder selected from the group consisting of a polyurethane, a styrene acrylic copolymer, a styrene butadiene copolymer, an acrylic, and combinations thereof, and about 0.5% to about 10% by weight of an expandable graphite. The article has a flame retardancy of at least 10 seconds upon direct flame exposure. The substrate can be cardboard, paperboard, gypsum board, a textile or foam, a building material, or a polymer film. The coating layer comprises about 70% to about 90% by weight of microencapsulated phase change material and has a thickness of about 1 mm to about 10 mm. In some embodiment, the coating layer is an outermost layer of the article. In other embodiments, the coating layer is positioned immediately adjacent an outermost layer of the article.

In all aspects, the microencapsulated phase change material can have a polymer wall comprising a melamine formaldehyde reacted with a crosslinking agent to form a unit cell:

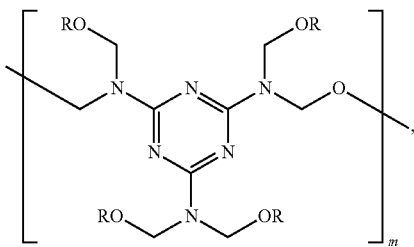

wherein R is H or $CH_3$ sold under the tradename NEXTEK by the Applicant.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 14 is a table of results for flammability test results with different flame retardant materials adjusted by weight of a coating according to an embodiment herein.

DETAILED DESCRIPTION

Figure 1:
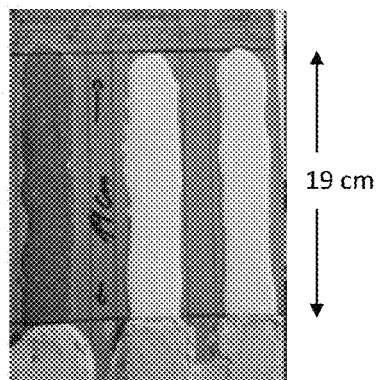
FIG. 1 is a photograph of (left to right) the inventive coating comprising expandable graphite, a comparative example coating comprising aluminum hydroxide, and a control coating having no fire retardant additive.

The following detailed description will illustrate the general principles of the invention, examples of which are additionally illustrated in the accompanying drawings.

As used herein, percent or the percent symbol, is understood to mean a percent by weight of the total composition or a layer unless expressly stated otherwise in the dried composition. It should also be noted that in specifying any range of concentration or amount, any particular upper concentration or amount can be associated with any particular lower concentration or amount.

Except in the working examples, or where otherwise explicitly indicated, all numbers in this description indicating amounts, parts, percentages, ratios, and proportions of material, physical properties of material, and conditions of reaction are to be understood as modified by the word "about." "About" as used herein means that a value is preferably +/−5% or more preferably +/−2%. % are typically % by wt, also referred to as wt/wt herein.

The compositions and layers that have a microencapsulated phase change material therein are the target of this disclosure, especially to increase the concentration of the PCM capsules while mitigating the flammability related with the shear concentration of the PCM present. By concentrating the amount of PCM capsules in a single layer, the energy transfer away from a heat source is increased, thereby improving the effectiveness of the layer. For applications utilizing such PCM capsules, for example, building materials, mattresses, pillows, electronics, textiles, nonwoven carriers, and packaging, strong, non-rupturable, leak resistant capsules are desirable. Example microcapsules and core materials are discussed in the detail below.

Capsules

The capsules can be microcapsules or macrocapsules, which will typically have a relatively high payload of the core material relative to the amount of material forming the shell or capsule wall. A microcapsule is typically one having a diameter in the range from about 10 μm to about 10000 μm and more typically from about 30 μm to about 6000 μm.

Capsules can be constructed of various types of wall or shell materials to house a core material that comprises a flammable phase change material. The encapsulation process may be any known or herein after developed process.

Core

The core is typically a hydrophobic core material or composition that includes a heat-absorbing material that has a melting point at about −30° C. to about 100° C. and is selected from a group consisting of straight chain alkanes, alcohols, organic acids, and aliphatic acid containing at least 6 carbon atoms. These hydrophobic core materials are known as "phase change materials." Any of the example phase change material identified below may be present as the core material or may be part of a core composition alone or in combination with any other phase change material. Organic PCMs with melting points in a range of −9 ° C. to about 100° C. are commercially available from Rubitherm Technologies GmbH under the brand "RT." Other PCMS are commercially available from PureTemp, LLC and Croda International Plc.

Examples of suitable hydrophobic core materials include, but are not limited to, aliphatic hydrocarbyl compounds such as saturated or unsaturated $C_{10}$-$C_{40}$ hydrocarbons, which are branched or preferably linear; cyclic hydrocarbons; aromatic hydrocarbyl compounds; $C_1$-$C_{40}$-alkyl-substituted aromatic hydrocarbons; saturated or unsaturated $C_6$-$C_{30}$-fatty acids; fatty alcohols; C esters; and natural and synthetic waxes.

Examples of saturated or unsaturated $C_{10}$-$C_{40}$ hydrocarbons, which are branched or preferably linear, include, but are not limited to, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, and n-octacosane. Examples of cyclic hydrocarbons include, but are not limited to, cyclohexane, cyclooctane, and cyclodecane. Examples of aromatic hydrocarbyl compounds include, but are not limited to, benzene, naphthalene, biphenyl, o- or n-terphenyl. Examples of $C_1$-$C_{40}$-alkyl-substituted aromatic hydrocarbons include, but are not limited to, dodecylbenzene, tetradecylbenzene, hexadecylbenzene, hexylnaphthalene or decyinaphthalene. Examples of saturated or unsaturated $C_6$-$C_{30}$-fatty acids include, but are not limited to, lauric, stearic, oleic or behenic acid, and eutectic mixtures of decanoic acid with myristic, palmitic or lauric acid. Examples of fatty alcohols include, but are not limited to, lauryl, stearyl, oleyl, myristyl, cetyl alcohol, mixtures such as coconut fatty alcohol, and the so-called oxo alcohols which are obtained by hydroformylation of α-olefins and further reactions. Examples of C esters include, but are not limited to, $C_1$-$C_{10}$-alkyl esters of fatty acids, such as propyl palmitate, methyl stearate or methyl palmitate, and their eutectic mixtures or methyl cinnamate. Examples of natural and synthetic waxes include, but are not limited to, montan acid waxes, montan ester waxes, polyethylene wax, oxidized waxes, polyvinyl ether wax, and ethylene vinyl acetate wax.

The above phase change materials are flammable.

Wall

The wall material can be any known or herein after developed wall material, for example, melamine resin, urea resin, melamine formaldehyde resins, urea resorcinol resins, acrylic resin, polystyrene, polyurethane, polyamide, poly methyl methacrylate, epoxy, polyethylene, polyester, polyvinyl alcohol, polyurea, and gelatin may be used.

In one embodiment, the microcapsules may be those made according to the methods disclosed in co-owned U.S. Pat. No. 10,005,059, available under the NEXTEK® brand from Microtek Laboratories, Inc. The methods disclosed therein for producing capsules, in particular are in situ polymerization methods. The microcapsules have a core material comprising a phase change material and the shell is made by reacting a melamine formaldehyde prepolymer with the crosslinking agent disclosed in as disclosed in WO/2012/044544. The melamine formaldehyde prepolymer is preferably CYMEL® 385 melamine formaldehyde resin. However, other CYMEL brand MF resins may be used or other brand name MF resins, alone or as mixtures to comprise the melamine formaldehyde prepolymer. The melamine formaldehyde resin may be one that includes phenol, such as a resorcinol urea formaldehyde resin. The crosslinking agent is a mixture of:

(a) a reaction product of a cyclic urea (U) and a multifunctional aldehyde (A), and (b) at least one crosslinker selected from the group consisting of (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1), (b2) reaction products of urea and/or cyclic ureas and formaldehyde, (b3) alkoxycarbonylaminotriazines, (b4) multifunctional isocyanates which may be partially or completely blocked, (b5) reaction products of phenols and aliphatic monoaldehydes, (b6) multifunctional epoxides, (b7) multifunctional aziridines, (b8) multifunctional carbodiimides, wherein any of the crosslinkers (a) and (b) which have hydroxyl groups may be etherified with one or more linear, branched, or cyclic aliphatic alcohols, (3) homogenizing the crosslinking agent into the emulsion to a selected particle size, and (4) adding a melamine formaldehyde prepolymer to the homogenized emulsion with mixing, and polymerizing the melamine formaldehyde prepolymer by adjusting the pH and/or addition of urea, thereby forming a polymerized shell surrounding core material in capsule form. In any aspect of the methods, (b) is more preferably at least one crosslinker selected from the group consisting of (b1), (b2), (b3), and (b5). The melamine formaldehyde prepolymer is present in a ratio by weight percent to the crosslinking agent of 1:1 to 4:1, more preferably 1.5:1 to 3.75:1.

General formula (I) below illustrates the unit cell believed to be formed from the melamine formaldehyde prepolymer and the crosslinking agent, in particular portion (a) of the crosslinking agent, the cyclic urea thereof interacting with the amine, alcohol and ether moieties to produce a structurally different polymer material.

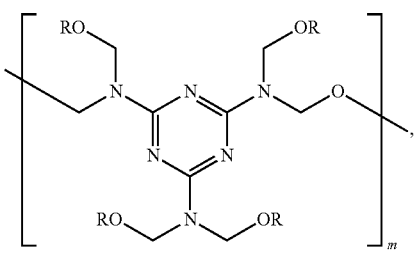

(I)

The capsule diameter selected depends upon a user's intended application or use for the coating layer. The payload of core material in any of the capsules may be about 10% to about 90% by weight, preferably at least 50%, more preferably at least 70%, and even more preferably at least 80%. In any of the capsules made by the methods disclosed herein, the payload of core material may be about 70% to about 80% by weight.

These capsules are excellent in reduced free formaldehyde level. The initial free formaldehyde level is less than 100 ppm, more preferably less than 80 ppm, less than 60 ppm, and even more preferably less than 40 ppm, and depending upon the method of making even less than 20 ppm, and even more preferably less than 10 ppm.

In another embodiment, the capsules may be gelatin PCM microcapsule, acrylic PCM microcapsule, or polyurethane PCM microcapsules, or combinations of any of the various types of PCM microcapsules.

WORKING EXAMPLES

Example 1: Comparative Flammability Study 1

Dried coating layers comprising microencapsulated phase change materials described above were mixed into a styrene acrylic binder having a 50% solid content and a $T_g$ (glass transition temperature) of about −55° C. To test the flammability, more particularly, the flame retardancy, different additives were added to the coating layers. Referring to FIG. 1, from left to right, an inventive coating has expandable graphite as the additive, a comparative example coating has aluminum hydroxide as the additive, and the control coating has no fire retardant additive.

The compositions of the coating formulation are as follows:

| | Inventive Coating | Comparative Example | Control |
|---|---|---|---|
| NEXTEK ® 24 PCM | 54.2% wt/wt | 51.3% wt/wt | 57% wt/wt |
| styrene acrylic binder | 41.7% wt/wt | 39.5% wt/wt | 43% wt/wt |
| expandable graphite | 4.2% wt/wt | — | — |
| aluminum hydroxide | — | 9.2% wt/wt | — |

Figure 2:
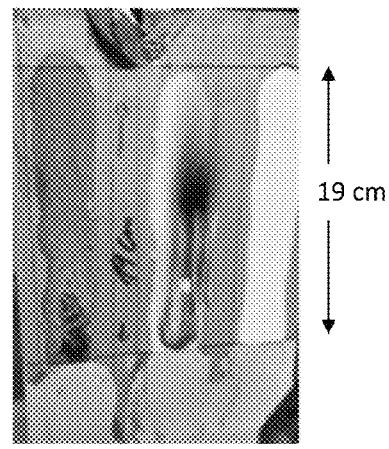
FIG. 2 is a photograph of the inventive coating after a flame was introduced and an active flame during the comparative example's fire retardant test.
Figure 3:
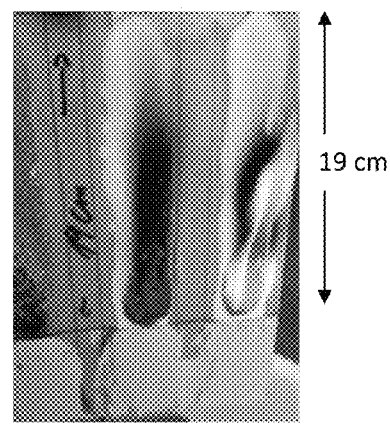
FIG. 3 is a photograph of the comparative example after its fire retardant test and an active flame during the control's fire retardant test.

Keep in mind that the PCM(s) in the core of the microcapsules are flammable. As seen in FIG. 2, after introduction of a flame to the inventive coating, there is barely a char to the surface of the inventive coating, but the comparative example is actively burning. The active burn of the comparative example was very surprising since aluminum hydroxide is a known flame retardant. Further, as shown in FIG. 3, the control, having no flame retardant additive present, burns easily. The comparative example burned nearly as well as the control, which is a complete failure of the burn test.

Surprisingly, the presence of the expandable graphite was effective as a flame retardant even with the high concentration of microencapsulated PCMs present.

Example 2: Comparative Flammability Study 2—Flame Retarding Additives

A B2 flame retardant test according to DIN 4102-1 (Germany's standardized flammability test for construction materials) was conducted on a plurality of flame retarding additives as set forth below, the results of which are presented in FIGS. 8 and 9. The scope of the test according to DIN 4102-1: 1998-05 section 6.2 is the classification of building materials by their fire behavior. The test (see 6.2.5) represents the stress of a small, defined flame (matched flame). Under these conditions, the flammability and spread of the flame must be limited within a certain time. The test is considered to be passed if none of the five samples:

a) for edge flaming (sample size=90 mm width×190 mm length); and b) in the event of surface exposure (specimen size=90 mm width×230 mm length), the flame tip reaches the measuring mark within 20 seconds.

Here, the following composition was used for the layer containing the microencapsulated phase change material with the only change being the substance used as the flame retarding additive. The flame retarding additives are listed in the table in FIG. 9.

Formulation
42% by weight styrene acrylic binder (solid content 40%)
3% by weight water
51% by weight NEXTEK® 24 microcapsules available from Microtek Laboratories, Inc.
4% by weight flame retarding additive Each formulation, except for the one with aluminum diethylphosphinate, had good compatibility with the other ingredients, i.e., in liquid form. Each formulation was applied to plywood as a 3 mm thick dry layer. Each plywood sample was allowed to dry for 24 hours at 60° C. A defined flame was introduced to each sample for a period of 15 seconds. Upon removal of the flame, each comparative example continued to burn and was extinguished 20 seconds after removal of the flame, i.e., 35 seconds into the test.

Figure 8:
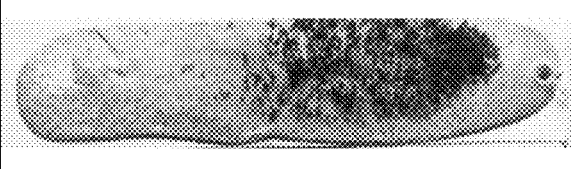
FIG. 8 is a chart with flame test images for a formulation with PCM microcapsules and expanded graphite.
Figure 9:
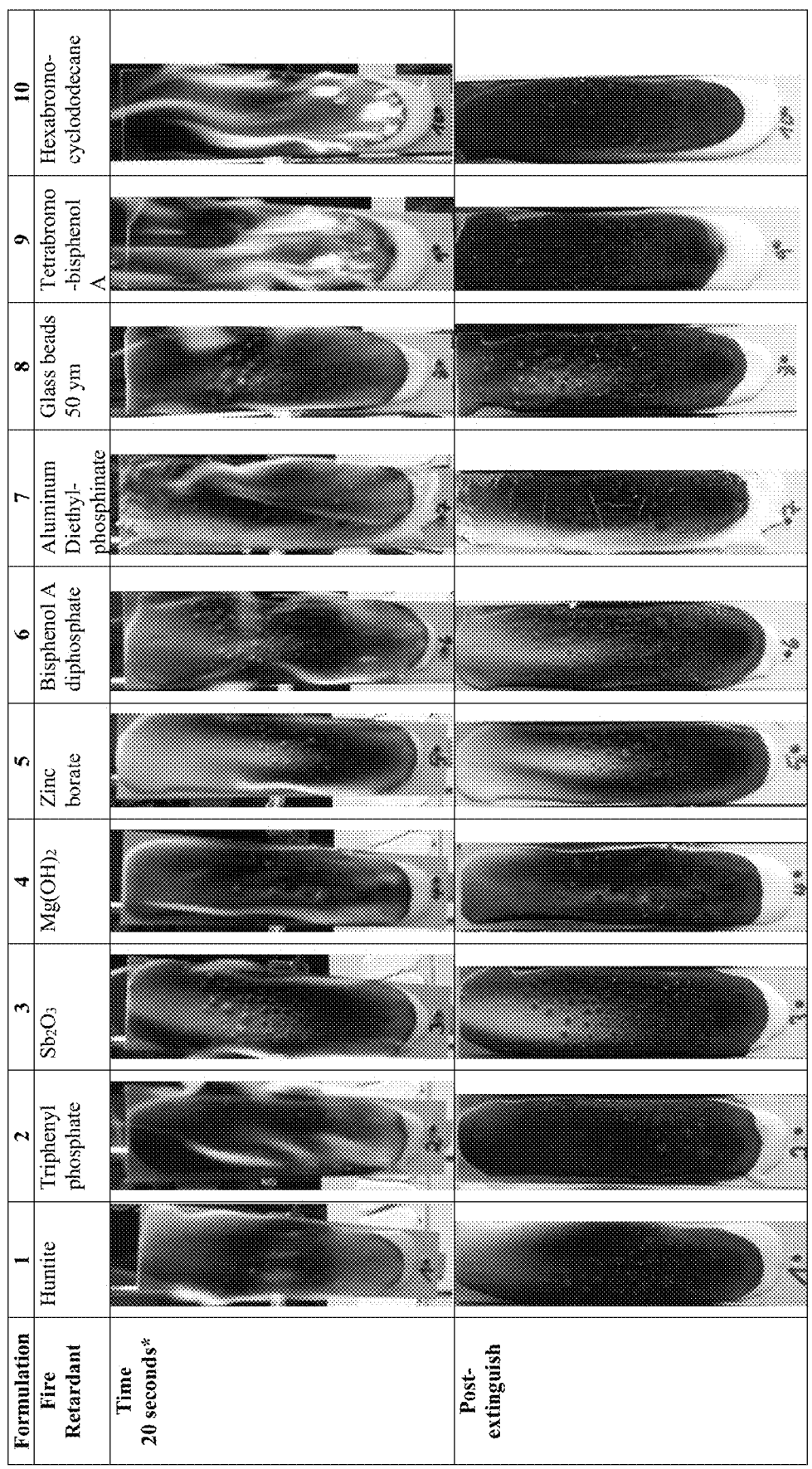
FIG. 9 is a chart of flame test images for multiple comparative examples.
Figure 10:
FIG. 10 is a photograph of a flammability test setup.

As is clearly evident by the photographs in FIGS. 8 and 9, each comparative sample, Formulations 1-10, failed the B2 standard test. Each formulation continued to burn the entire 20 seconds after the flame was removed, the flame extended the entire length of the sample, and Formulations 9 and 10 even accelerated the burn and created significant smoke.

In contrast, the formulation having expandable graphite, FIG. 8, has no flame at 20 seconds after removal of the defined flame and only evidences slight surface char at the point of direct exposure to the flame. As such, the formulation with expandable graphite passed the B2 classification test in accordance with the DIN 4102-1 standard for commercial products.

Example 3: Comparative Study 3—Other Microcapsules

The compatibility of other PCM microcapsules in the formulation, especially with the binder, was tested. The following composition was used for the layer with the only change being the PMC microcapsules used to verify that the shell of the microcapsule does not affect the formulation.

Formulation

42% by weight styrene acrylic binder (solid content 40%)
3% by weight water
51% by weight PCM microcapsules
4% by weight expandable graphite flame retarding additive The PCM microcapsules tested were: (1) gelatin PCMs (solid content 25%), and (2) polyurethane PCMs (solid content 45%). Both formulations were able to form dried films after being coated on a substrate and both passed the same flame test used above.

Commercial Product Application

Figure 4:
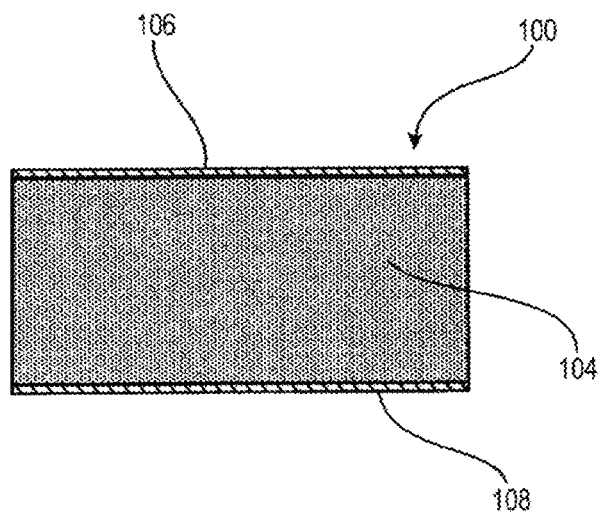
FIG. 4 is a longitudinal cross-sectional representation of a gypsum composite board of the prior art.

Referring to FIG. 4, as an example of a prior art building material, gypsum wallboard 100 was selected to represent a layered structure. Gypsum wallboard 100 is generally, in its simplest form, a composite board comprising a core 104, face sheet/liner 106 and back sheet/liner 108. In use, the face sheet 106 is typically facing the interior of a building and the back sheet 108 is against the studding defining a wall or ceiling of the building. Fire endurance/resistance of gypsum wallboard is measured by the period for which a board can withstand a standard fire test. The fire resistance of a wallboard is classified according to the ability for a wallboard to avoid an increase in temperature, flame passage, and structural collapse. In order to have various parties, including constructors, occupants, and regulating bodies, evaluate the fire endurance on a common basis, fire test assemblies are categorized into several standard arrangements.

Figure 5:
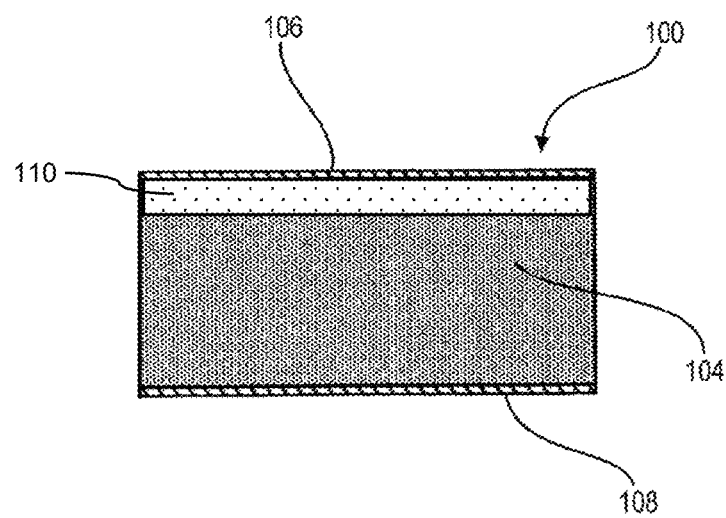
FIG. 5 is a longitudinal cross-sectional representation of one embodiment of an improved gypsum composite board.

Turning now to FIG. 5, to improve the fire resistance of the gypsum wallboard when it contains microencapsulated phase change material, the microencapsulated phase change material has been concentrated as a layer 110 most proximate the face sheet 106. Prior to the development of the formulations disclosed herein, such a concentration of PCM capsules proximate the surface of a wallboard was not possible due to the flammable characteristic of PCMs. Instead, the PCM capsules were required to be dispersed throughout a much thicker layer or layers toward the center of the produce.

Layer 110 comprises 50% to 90% by weight microencapsulated phase change material and 0.5% to 10% by weight expandable graphite dispersed together in a binder by dry weight. The binder is selected from polyurethanes, styrene acrylics, styrene butadienes, acrylics, and combinations thereof. The layer 110 may comprise 70% to 90% by weight of the microencapsulated phase change material and 2% to 7% by weight expandable graphite. In another embodiment, the layer 110 may comprise 70% to 90% by weight of the microencapsulated phase change material and 4% to 5% by weight expandable graphite.

The binder is an organic material in a solvent that will attach the mPCMs therein to a surface of a substrate. The binder can be a natural material such as latex or lignosulphonates or a synthetic material made from polymerization of monomers, such as but not limited to, styrene, butadiene, (meth)acrylates, acrylamide, acrylonitrile, maleimides, melamine, or similar polyols. The (meth)acrylates can be florinated or phosphohous-containing. The binder is dispersed or dissolved in a solvent, such as water, alcohols, or polar solvents. Binders can be used in the pure result of polymerization or functionalized in a separate reaction step. Some example binders include styrene-acrylate or styrene-butadiene copolymers, produced in 50% solutions in water under the brand names e.g., of PRIMAL® from Dow Chemical Company or LIGOS™ from Trinseo, styrene-butadiene emulsions under the brand name as BARRIERPRO® 4550 or 4555 from Mallard Creek Polymers. The binder selected should have functional groups that match the functional groups of the shell material of the PCM. In one embodiment, the binder is a styrene acrylic latex. An example acrylic latex is HYCAR® NH3069 non-halogen, self-crosslinking, acrylic polymer emulsion available from Lubrizol. Other commercially available binders include LUCIDENE™ 605 NV acrylic dispersion available form Dow, RAYLOK® brand phosphorous containing polyester acrylate available from Allnex, silicon acrylates available from Siltech. Ethylene vinyl acetate is another suitable binder.

The expandable graphite is one that under heat will expand and have char-forming properties or will extinguish flames. The expandable graphite has the ability to develop a volume of more than 100 mL from 1 g of material. One example, is Addforce FR RG available from Walter Thieme Handel GmbH, which has an expansion of 350×. Other examples include expandable graphite available from Asbury Carbons and NeoGraf Solutions, e.g. those graphite materials with an expansion ration at least greater than 200 cc/g, preferably greater than 250 cc/g, and more preferably greater than 280 cc/g. GRAFGUARD® expandable graphite flake is advertised by NeoGraf Solutions as one that "expands up to eight times more than competitive products." All products of Graphite EG FR are solids.

Expandable graphite is known as a flame retardant. The graphite is produced by intercalating sulfur compounds, such as sulfuric acid, in the graphite layers. U.S. Pat. No. 6,124,394 describes the performance of this compound upon heating to 800-1000° C. The '394 patent, however, suggests that a minimum expandability of 100 mL/g is required for performance. The '394 patent does not teach that the expansion effect holds in a matrix at very low concentrations. Since the '394 patent teaches tablets, there is no teaching that the expansion of the graphite can be visually observed as a destruction of the surface at concentrations above the claimed range, which is a negative undesirable effect.

In the formulations disclosed herein, the concentration of the flame retardant is 0.5% to 10% by weight, a low concentration, such that the expandable graphite does not disturb the layer and the physical properties of the coating. The successful flame tests of formulations with such low concentrations of highly expandable graphite were surprising.

The layer may also have a rheology modifier. The rheology modifier may be a deaerator, a dispersant, a flow improver, or a crystallization aid. In one embodiment, the rheology modifier is a polycarboxylate ether (PCE) superplasticizer. Example PCEs are commercially available superplasticizers for concrete.

The composition defining layer 110 is coated directly on a major surface of another layer of a layered structure at a thickness that provides 0.1 kg/m$^2$ to 2 kg/m$^2$ of the microcapsules, more preferably as 0.5 kg/m$^2$ to 1.5 kg/m$^2$ of the microcapsules in the dried layer 110. The thickness of layer 110 is about 1 mm to about 5 mm. The other layers of the layered structure may be a cardboard layer, a paperboard layer, or a gypsum board layer when the layered structure is a gypsum wall board. In FIG. 5, layer 110 is between the face sheet 106 and the gypsum core 104, which concentrates the PCMs at the interior surface of the gypsum board, rather than dispersing the PCMs throughout the gypsum core 4. While not shown, a second layer of layer 110 may be positioned between the gypsum core 4 and the back sheet 108.

In one embodiment, the substrate for layer 110 is a flexible layer and layer 110 is likewise flexible such that the two can be wound into a roll. Such a configuration is beneficial for manufacturing of layered structures because this two-layered structure can be manufactured in advance and be available on a roll for application to any number of different layered structures, not just to those layers present in a gypsum wallboard. The two-layered structure may then be laminated into any suitable layered structure.

Figure 6:
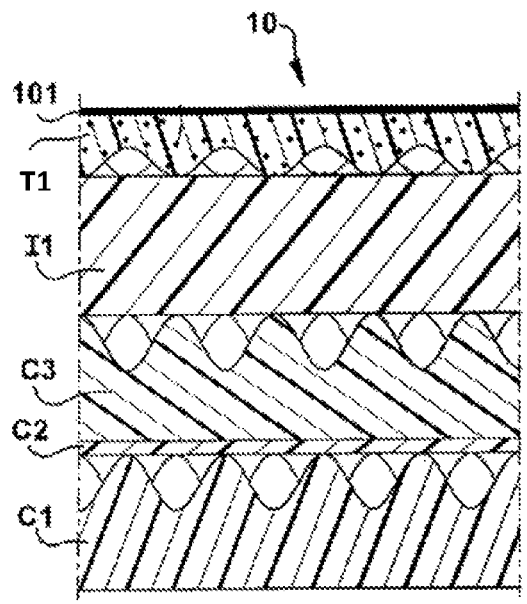
FIG. 6 is a longitudinal, partial cross-sectional representation of the layers of foam mattress of the prior art.

Referring now to FIG. 6, a prior art mattress 10 from US 2015/0067967 is represented that has various layers, referred to as core layers C1 to C3, intermediate layer I1, and a top layer T1, which has a PCM coating layer 101 applied to a top surface thereof. The PCM coating layer 101 is applied by sprayed, rolled, or other mode of application as a relatively thin layer or coating, approximately 50 mils to 100 mils or greater. Such a thin layer has a limited amount of PCM capsules dispersed over the surface area.

Figure 7:
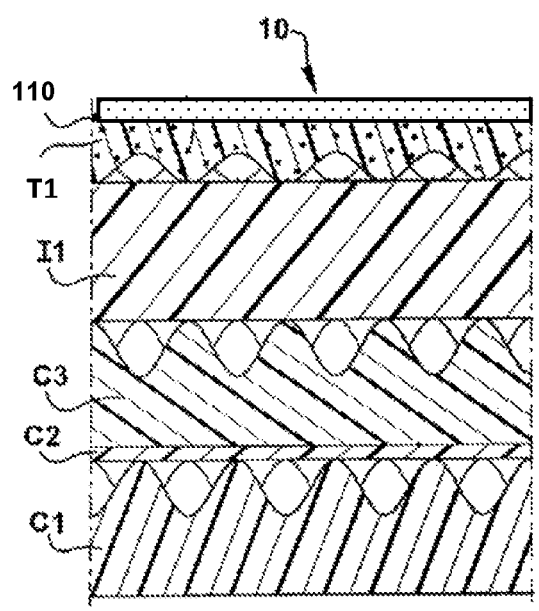
FIG. 7 is a longitudinal, partial cross-sectional representation of the layers of an improved foam mattress.

FIG. 7 is an embodiment of a foam mattress 10 product having layer 110, as described above for the gypsum board application, positioned most proximate a sleeping surface of the mattress. The composition defining layer 110 is coated directly on a major surface of another layer of the layered mattress structure 10 at a thickness that provides 0.1 kg/m$^2$ to 2 kg/m$^2$ of the microcapsules, more preferably as 0.5 kg/m$^2$ to 1.5 kg/m$^2$ of the microcapsules in the dried layer 110. The thickness of layer 110 is about 1 mm to about 5 mm.

In all embodiments and all aspects, the layer 110 may have a release liner applied directly thereto opposite the substrate to prevent the layer 110 from sticking to the wrong surface of the substrate. As such a three-layer structure results that has in order, the substrate, the layer 110, and the release liner, which may be wound into a roll.

In all embodiments and all aspects, the formulations disclosed herein are suitable for roll coating applications. Further, technical application methods are spray coating or immersion. Spray coating can be performed with high pressure and low pressure, even in these cases smooth surfaces with effects according to the described performance can be achieved.

Example 4

Batch Preparation

The binder, which was in the form of a polymer emulsion, was weighed into a clean, dry beaker and placed on a stir plate. The expandable graphite was added to the binder with stirring. If water was to be added, it was weighed and added next with continued stirring. The microcapsules were weighed and added next with stirring, preferably by slow incremental additions. The batch was stirred for approximately 30 minutes until smooth.

Coating Method

A substrate cut to appropriate sample test size, 6 mm by 20 mm, was prepared and then coated with a 5 mm thick×4 mm wide application of the formulation made by the batch preparation above. This sample was dried overnight in a 65° C. oven.

Flammability Test

Flammability was again tested according to DIN 4102-1 standard, specifically section 6.2.5.3. for surface testing. The testing setup comprised marking each sample at 20 mm and 170 mm from the edge of coating, handing each sample as shown in FIG. 8 with a bowl of water below the sample, igniting a propane torch with its flame adjusted to the lowest setting, holding the flame of the propane torch approximately 14 mm from the surface of the coating at the 20 mm mark, and timing the exposure such that the flame was removed after 15 seconds. If the surface ignited and flame remained burning on the surface, a second timer was started immediately subsequent to the 15 seconds of flame exposure to measure how long until the flame reached the 170 mm mark or self-extinguished.

The coating from Example 2 above was used to make a base-line sample for comparison against varying concentrations of the components or different commercially available binders or expandable graphite as seen in the table below.

TABLE 1

| Trial # | Binder | (wt %) | Expandable Graphite | (wt %) | NEXTEK® 24D Microcapsules (wt %) | Water (wt %) | Coating Thickness (mm) |
|---|---|---|---|---|---|---|---|
| 1 | LIGOS™ C3013 | 42 | ASBURY™ 3772 | 4 | 51 | 3 | 3.6 mm |
| 2 | LIGOS™ C3013 | 42 | NEOGRAF™ | 4 | 51 | 3 | 1.9 mm |
| 3 | BARRIERPRO® 4555 | 42 | ADDFORCE™ FR EG 350 | 4 | 51 | 3 | 3.9 mm |
| 4 | BARRIERPRO® 4550 | 42 | ADDFORCE™ FR EG 350 | 4 | 51 | 3 | 3.8 mm |
| 5 | HYCAR® NH3069 | 40 | ADDFORCE™ FR EG 350 | 4 | 49 | 7 | 3.2 mm |

Figure 11:
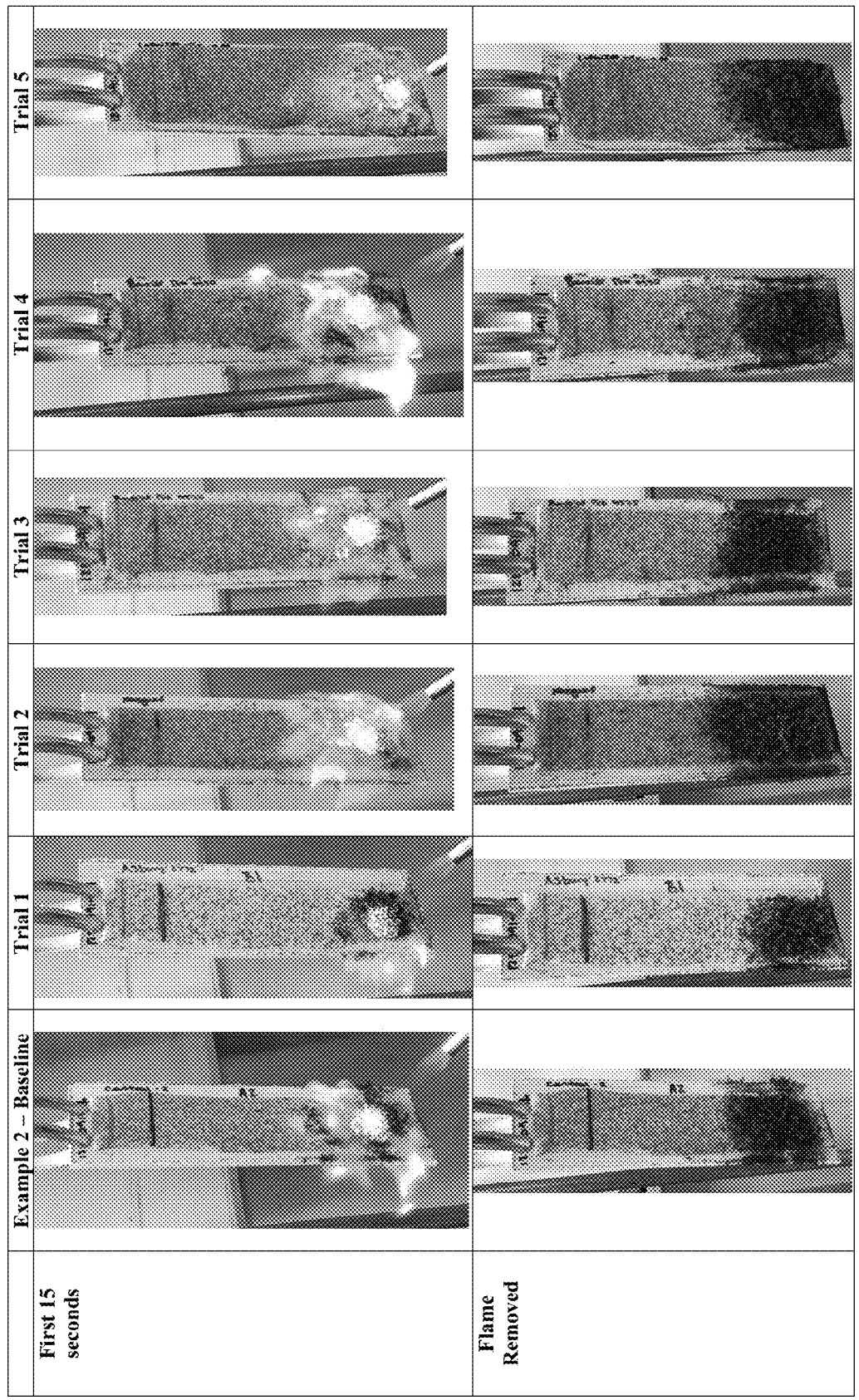
FIG. 11 is a chart of photographs taken during and after a flammability test for the Trials in Example 4 set forth herein.
Figure 12:
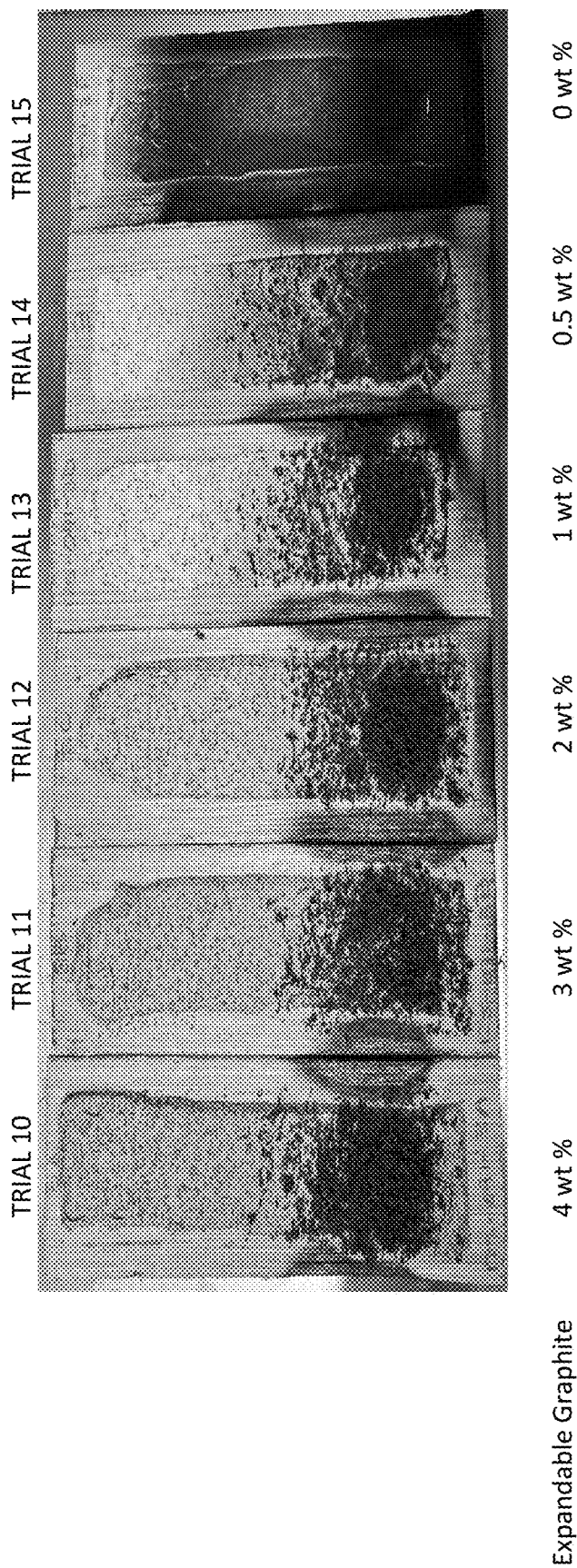
FIG. 12 is a photograph of post-flammability results for trials having a change in the concentration of expandable graphite.

The trials were dried for 1 day, and the coating thickness in the table above is the average of the thickness as measured at the top, middle, and bottom of the coating. Photographs of the flammability test for the coating from example 2 and each of Trials 1-5 are provided in FIG. 11. The char marks on each sample were measured and Each Trial passed the flammability test because none of the Trial samples ignited after the flame was removed; hence, a flame did not teach the 170 mm gauge mark within the allotted time under the test standard. The building materials with the coatings each passed the B2 standard.

Example 5: Batch Stability and Flexibility

The following four trials were made and tested for stability and flexibility over a 4.5-week period on a weekly basis. The below coatings were applied to a 2 mil Teslin substrate according to the methods disclosed above. Each Trial was placed in a 65° C. oven for 4.5 weeks, evidencing a 2-year accelerated aging equivalence, and was tested weekly to determine its flexibility according to the following Flex Test Method.

Stability Testing Method

Trials having a wet coating were transferred to labeled containers with lids and placed in a 50° C. oven for 1 week, evidencing an 8-week accelerated aging equivalency. These Trials were tested for pH and viscosity as a measure of stability. The coating formulations were thixotropic. The Viscosity was measured after spinning 10 minutes with a Spindle #6 at 30 rpm.

TABLE 3

Flexibility Data

| | Trial # | | | |
|---|---|---|---|---|
| | 6 | 7 | 8 | 9 |
| Week 1 | 1 small crack, edges popped up | 1 large crack across coating, 1 small crack, edges popped up | No cracks, edges well adhered | 1 large crack, edges popped up slightly |
| Week 2 | 3 cracks across coating, edges popping | 3 cracks across coating, edges popping, middle adhered mostly | 2 cracks across coating, most flexible of coatings, edges well adhered | 2 cracks across coating, edges popping slightly |
| Week 3 | 3 cracks across coating; coating rigid | 3 cracks across coating, coating rigid | 2 cracks across coating; coating rigid, less so than Trials 6 and 7 | 2 cracks across the coating; coating rigid, less so than Trials 6 and 7 |
| Week 4 | Same as week 3 | Same as week 3 | Same as week 3 | Same as week 3 |
| Week 4.5 | Same as week 3 | Same as week 3 | Same as week 3 | Same as week 3 |

Trials 8 and 9 remained more flexible than Trial 6 and 7. The pH decreases slightly in all batches, and the viscosity

TABLE 2

Stability Data

| Trial # | Binder (37 wt %) | Expandable Graphite (3.5%) | Phase Change Material (59.5 wt %) | Coating Thickness (mm) | Initial pH\|viscosity | 8 week aging pH.\|viscosity |
|---|---|---|---|---|---|---|
| 6 | BARRIERPRO ® 4550 | ASBURY ™ 3772 | NEXTEK ® 24D microcapsules-cake at 88.1% solids | 3.6 mm | 6.85\|4500 cp | 6.51\|13200 cp |
| 7 | BARRIERPRO ® 4550 | NEOGRAF ™ | NEXTEK ® 24D microcapsules-cake at 88.1% solids | 1.9 mm | 6.90\|3600 cp | 6.66\|5800 cp |
| 8 | BARRIERPRO ® 4550 | ADDFORCE ™ FR EG 350 | NEXTEK ® 24D microcapsules-cake at 88.1% solids | 3.9 mm | 7.14\|1800 cp | 6.49\|1900 cp |
| 9 | BARRIERPRO ® 4550 | NEOGRAF ™ | NEXTEK ® 24D microcapsules-cake at 88.1% solids | 3.8 mm | 7.07\|2100 cp | 6.44\|4400 cp |

Flex Testing Method

With the dried coating facing outward on a 2 mil Teslin substrate, wrap the substrate and coating around a 3-inch core, such as a cardboard core, and hold for five seconds. Flip the dried coating to now facing inward and wrap the substrate and coating around the 3-inch core and hold for five seconds. Record observations of the flexibility.

was the best in Trial 8, i.e., it was the least variable over time. Based on these results, the formulation from Trial 8 was used for further testing.

Example 6: Expandable Graphite Lower Concentration Limit Verified

Trial 8's formulation was varied as set forth below. The Trials were made with the Batch Preparation Method and Coating Method, and tested according to the Flammability Testing Method set forth above. The substrate for Trials 10-15 was 5.1 mm thick plywood.

TABLE 4

| Trial # | Binder BARRIERPRO® 4555 (wt %) | Graphite ASBURY™ 3772 (wt %) | Phase Change Material Microcapsules | (wt %) | Water (wt %) | Additive (0.99%) |
|---|---|---|---|---|---|---|
| 10 | 36.39 | 3.96 | NEXTEK® 24C | 52.8 | 5.87 | Xanthan Gum |
| 11 | 36.88 | 2.97 | NEXTEK® 24C | 53.24 | 5.92 | Xanthan Gum |
| 12 | 37.38 | 1.98 | NEXTEK® 24C | 53.69 | 5.97 | Xanthan Gum |
| 13 | 35.42 | 0.93 | NEXTEK® 24D | 50.63 | 13.03 | |
| 14 | 35.65 | 0.46 | NEXTEK® 24D | 50.83 | 13.06 | |
| 15 | 37.99 | 0 | NEXTEK® 24D | 54.04 | 7.97 | |

The percent solids for NEXTEK® 24C microcapsules (cake) is 88.1%.
The percent solids for NEXTEK® 24D (cake) is 98.51%.

The percent solids for NEXTEK® 24C microcapsules (cake) is 88.1%. The percent solids for NEXTEK® 24D (cake) is 98.51%.

Figure 13:
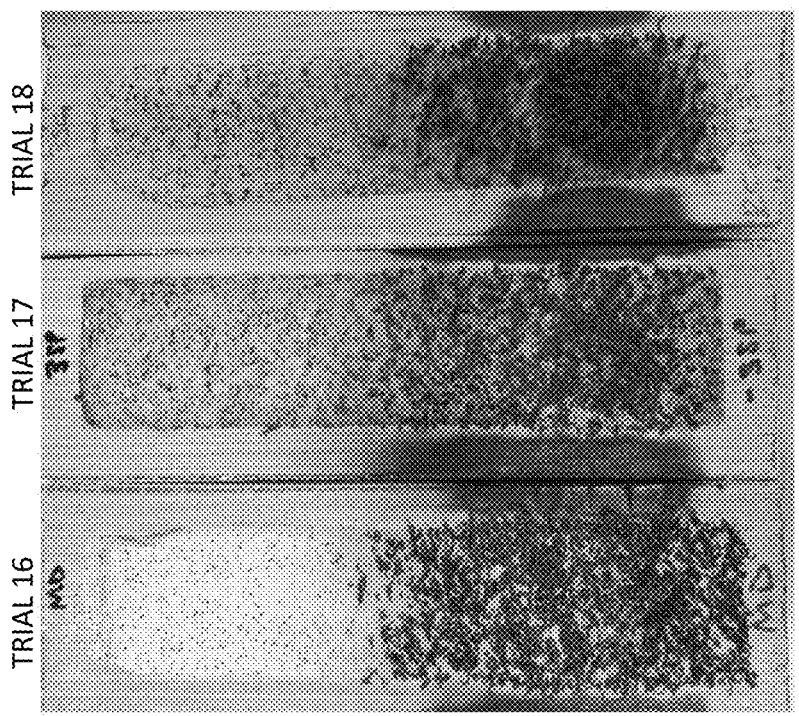
FIG. 13 is a photograph of post-flammability results for trial having different types of microencapsulated phase change materials.

FIG. 13 is a photograph of Trials 10-15 after completion of the Flammability Test Method. The sample with zero expandable graphite ignited and the flame reached the top of the sample coating within 20 seconds. Trials 10-12 did not ignite. Trial 13 ignited at the plywood side and self-extinguished after 30 seconds. Trial 14 did not ignite. As such, each sample is viable, with concentrations of greater than 1 wt % being preferable.

Example 7: Microcapsule Alternatives

The majority of the Trials in Examples 1-5 were performed with NEXTEK® brand microcapsules made by the Applicant. Other microcapsules were tested to show that other microcapsule wall chemistry does not negatively affect the flammability test. Three new Trials were performed using a MICRONAL brand microcapsule which has a polyacrylic wall with an alkane blend PCM core, a sustainable gelatin/gum arabic wall with a fatty acid ester PCM core, and a sustainable polyurea wall with a fatty acid ester PCM core. The coatings were made with the Batch Preparation Method and Coating Methods set forth above. The substrate was 5.1 mm thick plywood.

TABLE 5

| Trial # | Binder BARRIERPRO® 4550 (wt %) | Expandable Graphite ASBURY™ 3772 (wt %) | Microcapsules | (wt %) | Additive | (wt %) |
|---|---|---|---|---|---|---|
| 16 | 33.81 | 3.22 | MICRONAL® 24 Dry | 41.06 | Water | 21.92 |
| 17 | 37.19 | 2.01 | Gelatin/gum arabic w 1% 80 TWEEN added to slurry | 60.30 | Xanthan Gum | 0.5 |
| 18 | 37.37 | 2.02 | Polyurea | 60.61 | | |

FIG. 14 is a photograph of Trials 16-18 after completion of the Flammability Test Method. Each Trial was successfully passed the flammability test. No ignition of the coating occurred. The microcapsules' shell chemistry/material had no effect on the flame retardance of the coatings. The microcapsules' shell chemistry/material can affect texture, viscosity, and color.

Example 8: Additional Flame Retardant Materials Tested

As discussed above with respect to FIG. 9, ten different flame retardant (FR) materials were tested. Each FR failed the flammability test. Additional flame retardant materials, in particular inorganic flame retardant materials, were tested at a percent weight between 2% to 10% by wt of a coating composition according to the formulation below:

Formulation
39 to 44% by wt styrene butadiene binder (BARRIERPRO® 4555) (varying as the concentration of flame retardant varies)
47 to 54% by wt PCM microcapsules
2 to 10% by wt inorganic flame retardant
0 to 0.5% by weight thickener The Batch Mixing Method was followed to produce the trials set forth in the table in FIG. 14. Each formulation was coated on a 5.1 mm thick plywood substrate according to the Coating Method above and tested according to the Flammability Testing Method.

The flame retardants tested were an alumina trihydrate, a magnesium powder available from Fisher Chemical, a fine-particle ammonium polyphosphate under the brand name EXOLIT® AP 422 available from Clariant, a boric oxide-zinc oxide mixture under the brand name FIREBRAKE® ZB available from U.S. Borax, and an inorganic phosphorous and nitrogen compound under the brand name AFLAMMIT® NAH 2 available from THOR. The only one that passed the test was the boric acid-zinc-oxide mixture at 10% by weight, but the amount of PCM microcapsules was at the minimum end of the range.

Example 10: Substrate Alternatives

Figure 15:
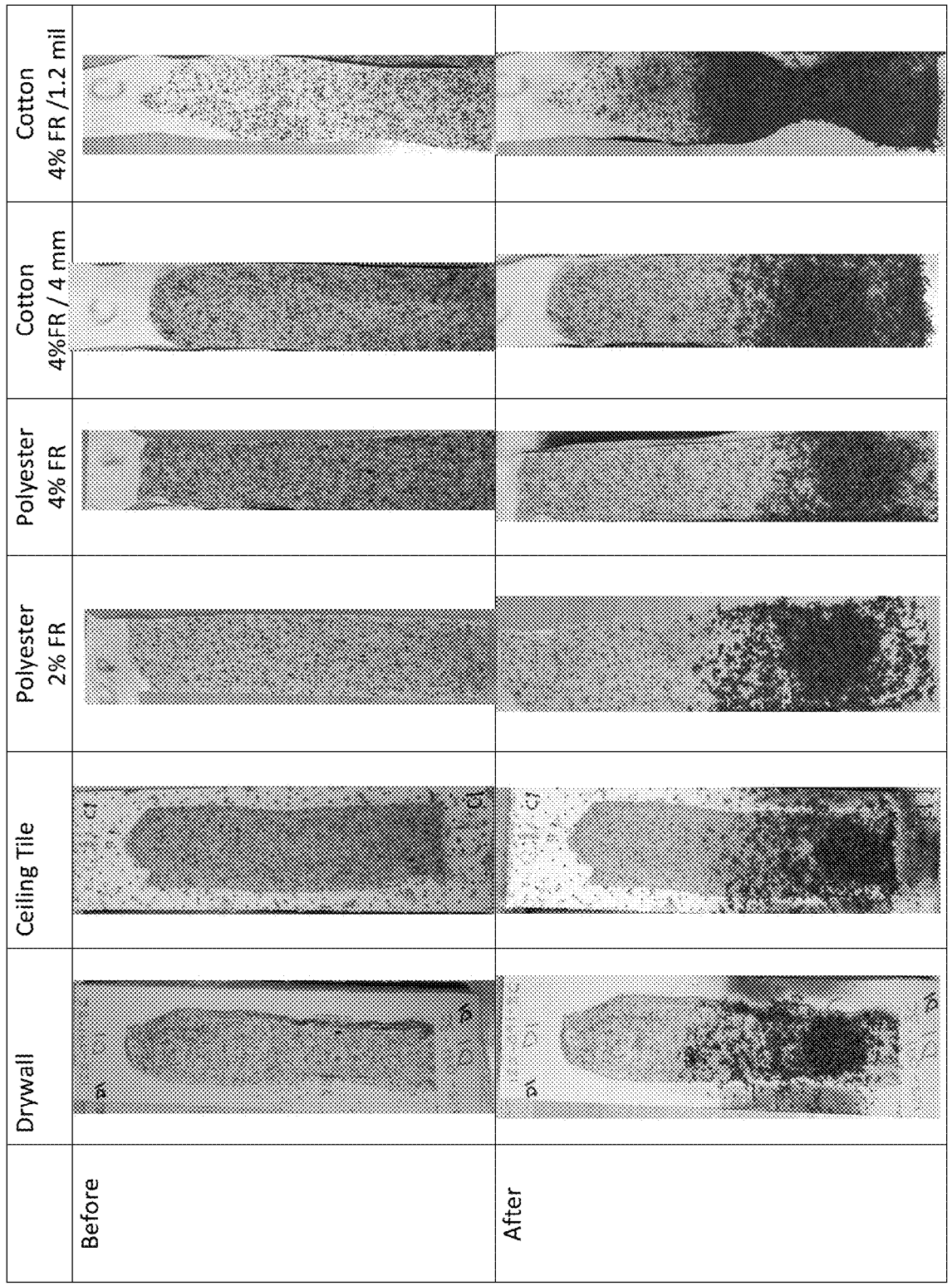
FIG. 15 is a table of photographs of samples before and after a flammability test for coatings comprising expandable graphite layered and dried on differing substrates, such as drywall, ceiling tile, polyester, and cotton.

Trial 10 and 12 were selected from Table 4 above to be tested on other substrates such as drywall, ceiling tiles, polyester, and cotton. The Coating Method was followed to apply each formulation to each of these alternate substrates. Each was tested according to the Flammability Testing Method set forth above. Photographs before and after the Flammability Testing Method are present in FIG. 15. Additional information is found in Table 6 below.

TABLE 6

| Substrate | Trial Formulation | Expandable Graphite % by wt | Notes/ Coating Thickness | Flame Test Results |
|---|---|---|---|---|
| Drywall | Trial 12 | 2 | Large bubbles | Mostly self-extinguished immediately. Small section on side burned 16 seconds. No visible smoke. |
| Ceiling Tile | Trial 12 | 2 |  | Mostly self-extinguished withing 3 seconds. Bottom edge burned 16 seconds. Low smoke. |
| Polyester | Trial 12 | 2 | 4 mm | Bulk of coating self-extinguished within 3 seconds, edge of coating self-extinguished after 10 seconds. |
| Polyester | Trial 10 | 4 | 3 mm | Bulk of coating self-extinguished immediately, one edge of coating self-extinguished after 9 seconds. |
| Cotton | Trial 10 | 4 | 4 mm | Coating self-extinguished immediately. |
| Cotton | Trial 10 | 4 | 1.2 mil | Failure - Substrate curled and coating burned very quickly until extinguished with water. |

The batches in Table 6 displayed favorable results, except for the 1.2 mil thickness coating on the cotton. The tests indicate that the coating containing expandable graphite can be successful on various substrates with pre-selected thicknesses.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

It is contemplated that numerous other configurations of layers comprising the microcapsules may be created. In short, it is the Applicants' intention that the scope of the patent issuing herefrom be limited only by the scope of the appended claims.

What is claimed is:

1. A non-flammable structure comprising:
    a substrate;
    a layer applied to the substrate, the layer in dried form has a thickness of about 1 mm to about 5 mm and comprises:
    a binder having mixed therein about 50% to about 90% by weight of microencapsulated phase change material and about 0.5% to about 10% by weight of an inorganic flame retardant,
    wherein the inorganic flame retardant has a volume that increases upon exposure to heat or fire,
    the binder is selected from the group consisting of a polyurethane, a styrene acrylic copolymer, a styrene butadiene copolymer, an acrylic, and combinations thereof, and the layer in dried form provides 0.1 kg/m$^2$ to 2 kg/m$^2$ of microcapsules.
2. The non-flammable structure of claim 1, wherein the inorganic flame retardant comprises an expandable graphite.
3. The non-flammable structure of claim 2, further comprising a rheology modifier.
4. The non-flammable structure of claim 3, wherein the rheology modifier is a polycarboxylate ether superplasticizer.
5. The non-flammable structure of claim 1, wherein the binder is the styrene acrylic copolymer.
6. The non-flammable structure of claim 1, wherein the microencapsulated phase change material is about 70% to about 90% by weight of the layer.
7. The non-flammable structure of claim 1, wherein the crosslinking agent comprises
    (a) a reaction product of a cyclic urea (U) and a multifunctional aldehyde (A), and
    (b) at least one crosslinker selected from the group consisting of
    (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1),
    (b2) reaction products of urea and/or cyclic ureas and formaldehyde,
    (b3) alkoxycarbonylaminotriazines,
    (b4) multifunctional isocyanates, optionally partially or completely blocked,
    (b5) reaction products of phenols and aliphatic monoaldehydes,
    (b6) multifunctional epoxides,
    (b7) multifunctional aziridines, and
    (b8) multifunctional carbodiimides,
    wherein any of the crosslinkers (a) and (b) which have hydroxyl groups are optionally etherified with one or more linear, branched, or cyclic aliphatic alcohols.
8. The non-flammable structure of claim 1, wherein the non-flammable structure is able to be wound into rolls.

* * * * *